Nov. 11, 1969   H. BRANDT   3,477,702
HEATING OF STONE FOR A ROTARY KILN
Filed May 22, 1967   3 Sheets-Sheet 2

INVENTOR
HERBERT BRANDT
By Jacobs + Jacobs

Nov. 11, 1969  H. BRANDT  3,477,702
HEATING OF STONE FOR A ROTARY KILN
Filed May 22, 1967  3 Sheets-Sheet 3

INVENTOR
HERBERT BRANDT
By Jacobs + Jacobs

United States Patent Office 3,477,702
Patented Nov. 11, 1969

3,477,702
HEATING OF STONE FOR A ROTARY KILN
Herbert Brandt, 5961 Rothemuhle uber Olpe,
Westphalia, Germany
Filed May 22, 1967, Ser. No. 640,201
Claims priority, application Germany, May 25, 1966,
A 52,576; Nov. 2, 1966, A 53,978
Int. Cl. F27b 7/34
U.S. Cl. 263—32    13 Claims

ABSTRACT OF THE DISCLOSURE

To ensure that waste gases issuing to atmosphere from a stone heating plant conform to regulations regarding dust-content, fine-grain stone is heated in a recuperatively heated trickle heater so that the stone does not make direct contact with the heating medium. The trickle heater may be provided with its own fuel combustion means, or may be heated by the waste gases from a device, comprising a rotating drum, in which coarse-grain stone is heated.

---

This invention relates to the heating of stone for use in admixture with tar for road construction purposes.

The different grain-size fractions of stone which are used for such road construction purposes are substantially, (a) Rock-flour or dust, which will be referred to hereinafter as dust, having a fineness which gives a residue of 10%–20% on a Din-sieve 70;

(b) Material, which will be referred to hereinafter as fine, having a grain size below 2 mm.;

(c) Material, which will be referred to hereinafter as coarse, with a grain size more than 2 mm.

The stone is usually heated in a rotating drum having exit gas and dust collecting devices. In conventional plants of this kind all of the stone is fed into the drum at the exit gas end and blades within the rotating drum move the stone to the firing end of the drum. From there, the material, which has been dried and heated up to approximately 300° C. is conducted by a conveyor plant to a screening plant wherein it is classified according to the various fractions. The various fractions are taken from funnels or intermediate hoppers of the screening plant, which are connected with it, are weighed in the mixing ratio prescribed for each case, and in still warm condition they are conducted to a mixing plant and thereafter to a tar-spraying plant.

In the rotating drum the material to be heated is in continuous contact with hot gases. Due to the circulation of the material in the drum it is partly heated up while in suspension and thus the heat transfer from the hot gas to the material is promoted. A considerable portion of the finer material is entrained by the gas.

The exit gases of such plants consequently have a comparatively high content of dust and fines and need extremely expensive multi-stage dust collecting plants; even so, up to the present time it has not been possible to meet fully the demands made by the supervising authorities for purification of air.

The application of wet dust collectors is generally not accepted. Bag-filters and electrical precipitators are too sensitive, particularly in case of portable plants, and under prevailing operating conditions they have only a very short life.

The object of the invention is therefore to simplify the dust collection from the exit gases of said heating installations in such a manner that the demanded purity degrees of the air can be obtained with insensitive mechanical dust collectors.

According to this invention, a heating installation for stone is characterised in that a recuperatively heated trickle heater is provided for heating of the fine-grained material portions separately from heating of the coarse-grained portions of the material.

This ensures that only the coarser portion of the material to be warmed up is heated in direct contact with firing gases, while the finer grain fractions trickle through a separate heater which effects the necessary heat transfer without any contact between these grains and the gases taking place.

Embodiments of the invention are shown in the accompanying drawings, wherein.

Figure 1:
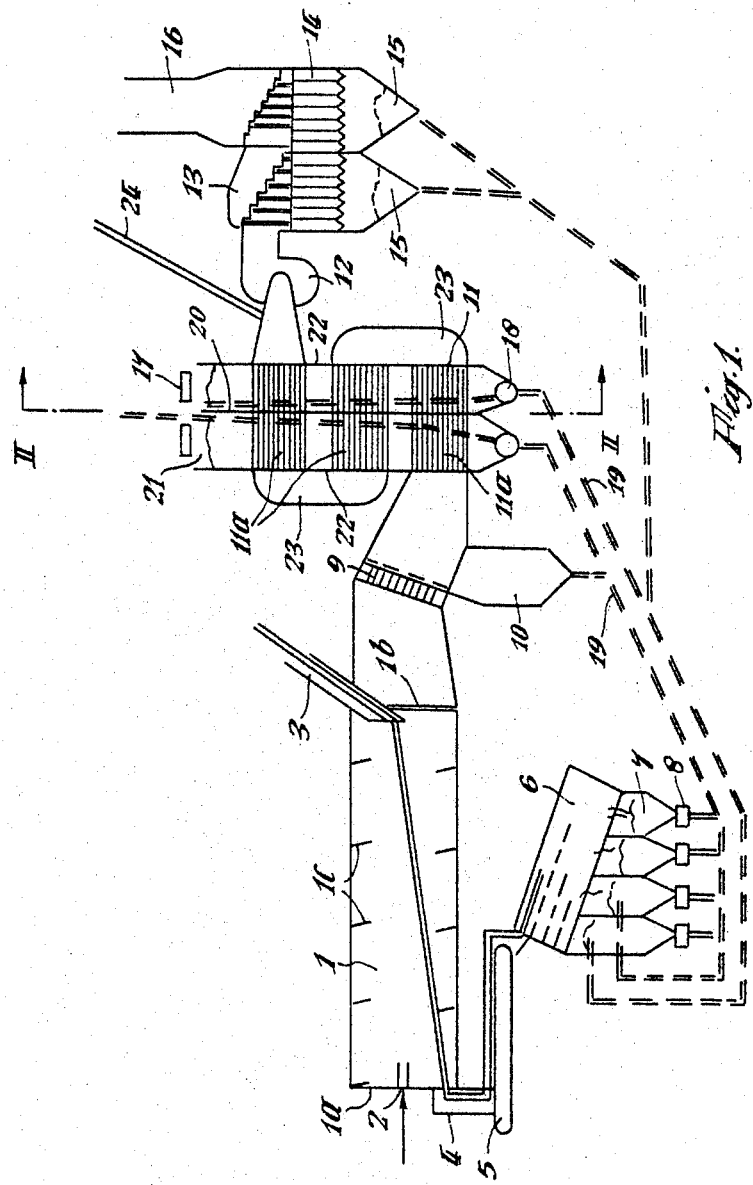
FIG. 1 is a diagrammatic side elevation of one embodiment.
Figure 2:
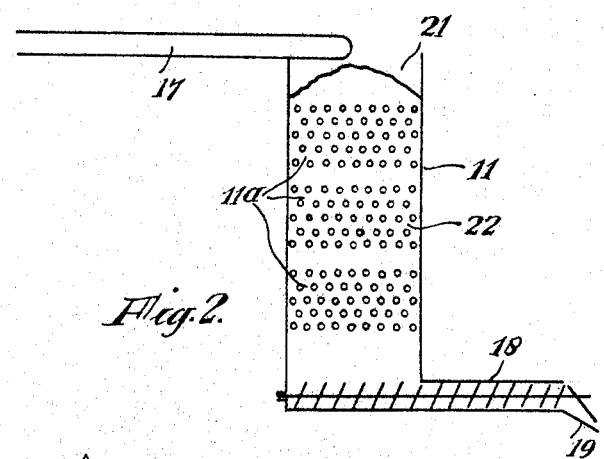
FIG. 2 is a diagrammatic elevation of part of the apparatus, taken on line II—II of FIG. 1.

Referring to FIGS. 1 and 2, a drum 1 is journalled and driven rotatably in known manner which is not shown. An oil burner 2 is mounted in the firing end 1a of the drum. Coarse material is charged into the drum at the feed end 1b by means of a chute 3. Blades 1c within the drum cause the material to travel from one feed end 1b to the firing end 1a whence it is transported to a discharging device 4 and thence to a conveyor 5 (which may be a hot bucket conveyor) and to a screening plant 6 which screens the material into various fractions. In hoppers 7 the screened fractions are collected separately from each other, and may thereafter be stored temporarily in intermediate hoppers, which are not illustrated, from where they are drawn off, by way of scales 8 to effect the desired mixing-ratio, into a mixing plant. From the mixing plant, which has not been illustrated, the material is conveyed into a further plant in which it is mixed with tar in still warm condition.

The waste gases leave the rotating drum 1 at a temperature of approximately 200° C. to 500° C. and flow through a primary dust-collecting plant 9, a heater 11 for fine grained material, and an induced draught fan 12, whence they are conducted by way of mechanical dust collectors 13 and 14 through a chimney 16 into the open air.

The major portion of the dust, particularly of the larger grain sizes, is collected in a hopper 10 from the primary dust collecting plant 9. The dust collecting plant 9 serves the purpose of cleaning the waste gas to such an extent, that no constriction of the cross-section or choking will occur in the tubes of the heater 11 and no wear in the induced draught fan 12 on account of the dust. The mechanical dust collectors 13 and 14 with their dust collecting hoppers 15 will separate the dust which has remained in the waste gas after passing through the collector 9 to such a degree that the gases will be discharged through the chimney 16 into the open air sufficiently clean to satisfy control requirements.

The heater 11 consists of bundles of tubes 11a which are traversed by the exit gas. Deflecting hoods 23 are mounted on the heater 11 in order to cause the waste gases to pass several times through the heater, successively through different bundles 11a of tubes, in cross-flow to the material being heated in the heater 11. The fine-grained material to be dried and heated in the heater 11 is charged thereinto by way of conveying devices 17 and, while being heated and dried by contact with the tubes 11a through which the hot waste gases flow, it trickles past the hot tubes down to the bottom of the heater 11. From there, the heated fine material is further transported by way of screw-conveyors 18. In the heater 11, the fine material is heated up to approximately 200° C. and from the conveyors 18 it can be led to the conveyor belt 5 to pass, together with the heated coarse material, which has a temperature of approximately 200–300° C., into the screening plant 6 for the separation of fractions, or the heated fine material can be led directly into the appropriate collecting hopper 7. The route of the heated fine material to the hoppers 7 is shown diagrammatically in FIG. 1 from the charging device 17 into the heater 11 and thence by way of the conveyors 18 and transporting means 19 into the hopper 7.

To allow that different fractions of fine material which are already separated from each other can be heated up simultaneously in the heater 11 the latter is provided with a separation wall 20 giving the heater two passages which are separated from each other. This separation wall 20 fulfils, furthermore, the purpose of supporting the centers of the tubes 11a, so that the tubes are not deformed by the load of the fine-grained material trickling over them. Depending on the tasks involved, it is also possible to provide several separation walls 20 instead of only one. The heater 11 thus consists of the heating tubes 11a through which pass the waste gases, side walls 22 into which the heating tubes are closely bolted, rolled in or welded in, the separation wall 20 which support the tubes, the deflectors 23, an opening 21 for charging the fine material into the heater 11 at the upper end below the conveyor devices 17, as well as discharge chutes with the screw conveyers 18 at the lower end.

The discharging devices of the hoppers 10 and 15 of the dust collecting plant can be connected to the conveying means 19 which transport the warmed fine material from the screw-conveyors 18 so that the separated dust can be returned to the material. Thereby the larger-grained dust from the hopper 10 and the finer dust from the hopper 15, can be transported to appropriate hoppers 7.

The screening device 6 and the mixing plant, which has not been illustrated, for the further preparation of the material are generally equipped with suction-devices so that they do not foul their environment by dust discharge. These suction devices are generally connected by pipe-lines with the exit gas plants in such a manner that the exhaust air is also cleaned in the dust collecting plant. Since this exhaust air is colder than the waste gas coming from the rotating drum, this air is admitted to the waste gas, in apparatus according to the present invention, through a conduit 24 disposed immediately before the induced draught fan 12 so that the heat exploitation of the waste gas in the trickling heater 11 is not restricted by the colder suction air.

It is not essential to use the firing gases, with which the coarser portions of the material to be heated up are in direct contact in the drum 1, also for the recuperative heating in the heater 11 of the finer grain portions, but the heater 11 can be equipped with its own heating plant.

By the separate heating up of the heater 11 there is the advantageous possibility of a more accurate regulation of the heating gas temperature and the temperature of the fine-grained material to be warmed. Furthermore, the heat input into the trickling material heater 11 is independent of the quantity of heat remaining in the waste gas of the device for the heating up of the coarse material, which is advantageous if there is temporarily only a demand for warm fine material, or for a larger quantity of fine material than of coarse material. The tubes 11a providing the heating surfaces in the heater 11 may have rhombic or lenticular cross-sections, and may be arranged in staggered formation in rows, and the larger diameters of the tubes being vertical or steeply inclined.

In pilot plants it has been proved that particularly dry material has such a poor trickling capability that it will trickle through bundles of round tubes either insufficiently or not at all. Contrary to this, the material will trickle in a sufficient measure through tube bundles consisting of tubes with rhombic or lenticular cross-sections, and, on account of the staggered arrangement of these tubes to each other, it will be agitated to such an extent that a sufficient convective heat transfer will be obtained from the tube walls to all particles of the material.

The trickling ability of the fine-grained material which is to be heated is improved by a slender rhombic cross-section shape, while the agitation of the material to be heated, which is required for a good heat transfer, is achieved by the staggered tube arrangement.

Figure 3:
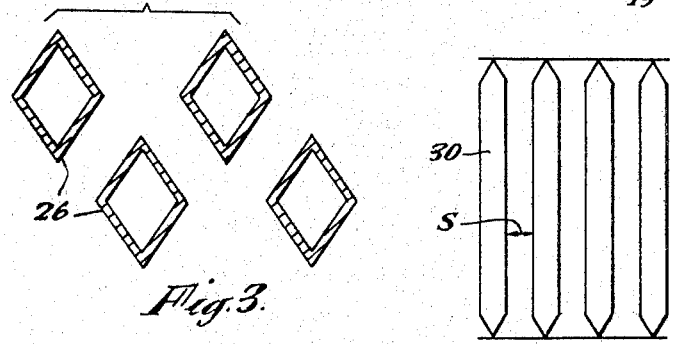
FIGS. 3 and 4 are enlarged sectional elevations of different forms of heating tube arrangements.
Figure 4:
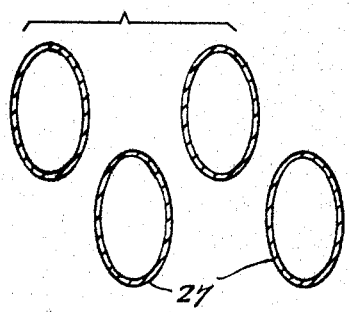

Favorable cross-section shapes of the tubes, ascertained by way of tests, are illustrated at 26 in FIG. 3 and at 27 in FIG. 4 with a suitable spacing from each other.

Figure 5:
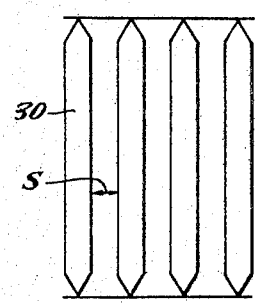
FIG. 5 is a diagrammatic side elevation of a modified form of heater casing and heating elements.

Hollow plate-shaped heating elements 30, FIG. 5, can be used in the heater 11 for the passage of the hot waste gases. In this case, the gaps $s$ between the elements, through which the material which is to be heated up trickles, must have a width not more than 100 times the coarsest grain diameter of the material to be heated, and not greater than 40 mm. The observation of this maximum gap width is absolutely necessary on account of the agitation of the fine-grained material which is required for a good transfer of heat. If on the other hand the gap width $s$ is chosen too big, some of the material to be heated would trickle through in between the heating surfaces without having come into contact with those surfaces.

Figure 6:
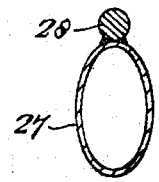
FIG. 6 is an enlarged cross-section of a modified form of heating element.

As shown in FIG. 6, the upper edges of the heating tubes 27 can be protected against wear by means of welded-on round irons 28.

Figures 7, 8:
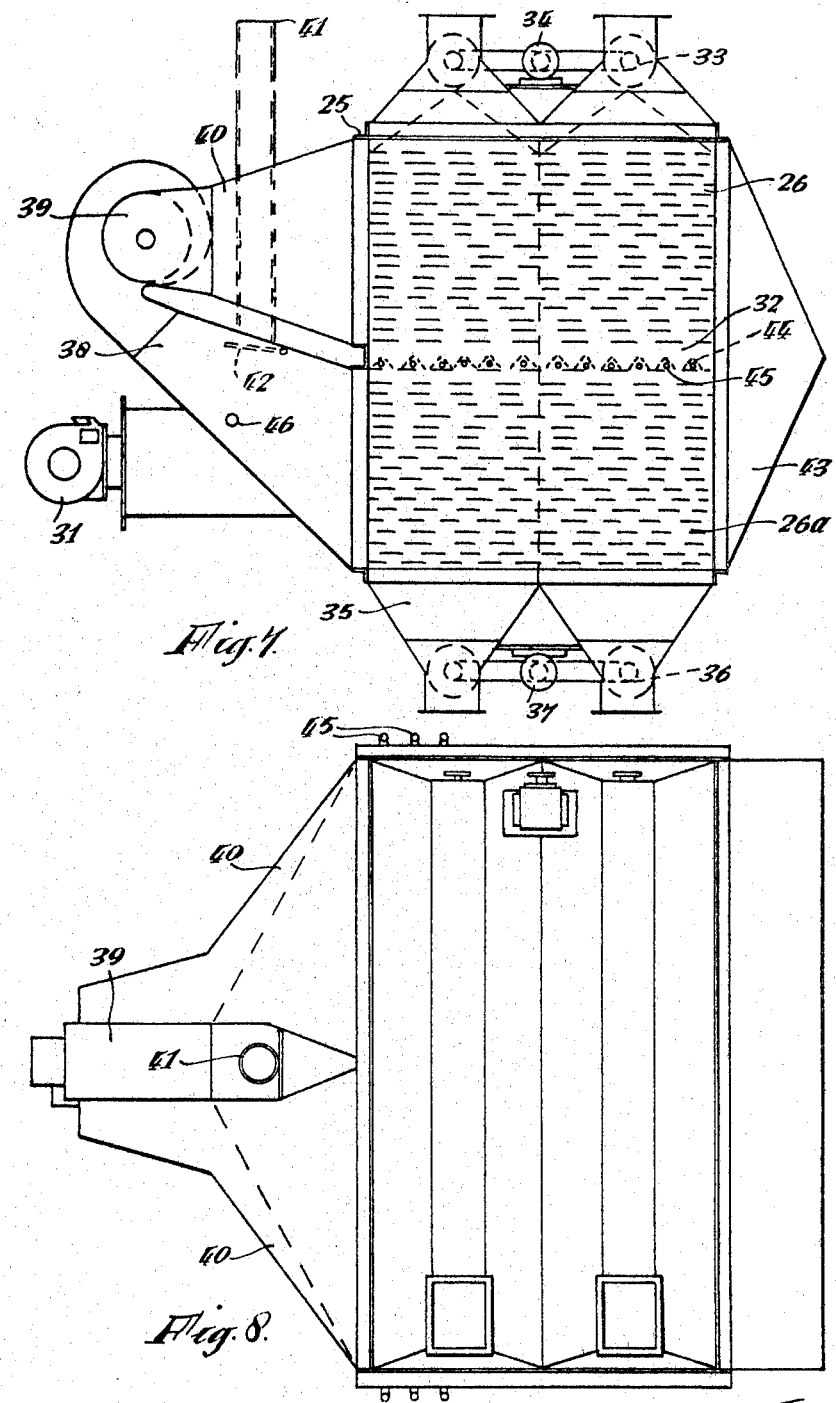
FIG. 7 is a diagrammatic side elevation of another embodiment of the invention.
FIG. 8 is a plan view corresponding to FIG. 7.

FIGS. 7 and 8 show a form of the trickling material heater with its own firing device 31. In this form, bundles of heating tubes, 26, 26a are arranged above each other in separate layers with a free space 32 therebetween, through which layers of tubes the heating gases pass in opposite directions.

The fine grained material which is to be heated is fed, uniformly distributed through the upper material inlet openings into the heater by way of screw-conveyers 33 equipped with drive units 34. Under heat absorption it trickles over the hot tubes through the upper and lower heating surface zones, 26 and 26a, down to the discharge hoppers 35. From there it is further transported by the discharge screw conveyers 36 which are equipped with drive units 37.

The firing means 31, for example an oil burner, is arranged in FIG. 7 on the left side of the trickling heater casing 25, and on the heating gas inlet duct 38.

The inlet gas duct 38 for the lower zone of the heating tubes, 26a, serves at the same time as the exhaust duct of a recirculation fan 39 arranged above it. Two outer suction ducts 40 to the fan 39 are connected with the outlet end of the upper heating tube zone, 26.

The plan view, FIG. 8, shows that a discharge chimney 41 is arranged between the two suction ducts 40. The chimney opens into the lower heating gas inlet duct 38. A regulating valve 42 is arranged at the inlet to the chimney.

On the right side of the FIGS. 7 and 8 the upper and lower heating tube zones 26 and 26a are shown connected with each other by means of a reversing duct 43.

Within the duct conduits the hot gases are recirculated several times, whereby the cooled down gases from the upper heating surface zones 26 are partly led back into the heating gas inlet duct 38. By regulation of the volume of the returned cooler gases an admissible mixing temperature is maintained.

Any excess quantity of the cooled down gases is blown from the heating gas inlet duct 38 through the stack 41 into the open air, the regulating of these gas volumes being determined by the valve 42 which is controlled by a thermostat 46 which is arranged in the zone of the admixed gases.

In the inlet duct 38 in which the combustion gases meet with the recirculated gases, one or more slotted plates may be arranged obliquely to the gas flow direction for a better mixing and distribution of these gases.

The fine-gained material which is to be heated up has, in general, a small moisture content between 1 and 8%. This moisture content evaporates during the heating up of the material in the trickling material heater to approximately 150° C. in the region of the lower heating surface zone 26a.

In order to avoid that the vapors arising from the material heating will condense again in the colder upper heating tube zone 26, roof-shaped elements 44 are arranged, in lateral direction to the tubes, in the free space 32 between the upper and lower heating tube zones 26 and 26a, or in other spaces at suitable points of the whole tube system. From these elements the vapors are led into the open air through lateral discharge tubes 45.

According to a preferred embodiment of the present invention, the heating tubes are arranged staggeredly with a center distance from each other not greater than 1.33 times the tube outer diameter.

The advantages which can be achieved by apparatus according to this invention consist particularly in the fact that by means of the preheating of the fine-grained material portions trickling in a separate heater a diminuation of the dust content to a fraction of the values obtained hitherto will be achieved without direct contact with the exit gas. Air-borne dust originates from the small abrasion of the coarse material. This duct is coarse and can be separated with the mechanical dust collectors in a sufficient measure, so that the limiting values according to the regulations for clean air can be observed without great expenditure and without operation difficulties.

From a heat-economy point, there is furthermore the advantage that a corresponding quantity of fuel can be saved or that with equal fuel consumption the capacity of the plant can be increased.

What I claim and desire to secure by Letters Patent is:

1. In an apparatus for heating stone of various particle sizes and means for separating said particles according to size, the improvement which comprises a separate heating unit for drying and heating fine-grained stone which comprises heat exchange material suitably enclosed, means for transferring heat to said material, means for conveying the fine-grained stone from the separating means to the separate heting unit, means for causing the fine-grained stone to trickle through the heated material and out an exit point and means disposed at the exit point for conveying the heated fine-grained stone to a further separating means or collection hopper.

2. The improvement according to claim 1 wherein the separate heating unit comprises a steeply depending chute and substantially horizontal tubes for the passage of hot waste gases, which tubes are arranged in staggered formation relative to each other.

3. The improvement according to claim 2, wherein the tubes have a rhombic cross-section with the larger diameter substantially vertical.

4. The improvement according to claim 2, wherein the tubes have a lenticular cross-section with the larger diameter substantially vertical.

5. The improvement according to claim 2, wherein the heating tubes are arranged staggeredly with a center distance from each other not greater than 1.33 times the tube outer diameter.

6. The improvement according to claim 2, wherein at least one intermediate wall is disposed within the heating unit which supports the tubes and which subdivides the heater into several zones.

7. The improvement according to claim 1, wherein the heat exchange material comprises plate elements, having gaps therebetween of not more than 100 times the coarsest grain diameter of the material which is to be heated for the width, and not more than 40 mm.

8. The improvement according to claim 1 wherein the heat exchange material is disposed in at least two separate zones parallel to each other with spaces between the zones, and roof-shaped elements are disposed in said spaces in transverse direction to the heating materials.

9. The improvement according to claim 1, wherein the heat exchange material is heated by the waste gas from the main heating unit.

10. The improvement according to claim 9, further comprising primary and secondary dust collectors and an induced draught fan.

11. The improvement according to claim 1, wherein the separate heating unit is heated independently of the main unit.

12. The improvement according to claim 11, further comprising a firing unit disposed at a lower inlet duct for hot combustion gases, and an inlet duct which also serves as the exhaust duct for a recirculation fan arranged thereabove.

13. The improvement according to claim 12, wherein the recirculation fan has suction ducts for cooled-down waste gases, which ducts connect said fan with the outlet openings of heating elements of an upper heating surface zone in the heater, while a gas-deviation duct is provided in the heater to connect the outlet openings of the heating elements of a lower heating surface zone in the heater with the gas inlet openings of the said upper zone heating elements.

References Cited
UNITED STATES PATENTS

| | | | |
|---|---|---|---|
| 3,385,580 | 5/1968 | Ruegg | 263—32 |
| 1,596,509 | 8/1926 | Pike | 263—32 |
| 2,761,668 | 9/1956 | Sylrest | 263—32 |
| 3,212,764 | 10/1965 | Muller et al. | 263—53 X |

JOHN J. CAMBY, Primary Examiner